United States Patent [12]
Makarovich et al.

(10) Patent No.: US 9,633,536 B1
(45) Date of Patent: Apr. 25, 2017

(54) MOTION SENSOR ALARM AND SPRINKLER DEVICE

(71) Applicants: Monica Makarovich, West Palm Beach, FL (US); Donald Kirkham, West Palm Beach, FL (US)

(72) Inventors: Monica Makarovich, West Palm Beach, FL (US); Donald Kirkham, West Palm Beach, FL (US)

( * ) Notice: Subject to any disclaimer, the term of this patent is extended or adjusted under 35 U.S.C. 154(b) by 94 days.

(21) Appl. No.: 14/864,968

(22) Filed: Sep. 25, 2015

Related U.S. Application Data

(60) Provisional application No. 62/055,957, filed on Sep. 26, 2014.

(51) Int. Cl.
*G08B 13/00* (2006.01)
*G08B 15/00* (2006.01)
*H04N 21/41* (2011.01)
*A01G 25/16* (2006.01)

(52) U.S. Cl.
CPC ......... *G08B 15/00* (2013.01); *H04N 21/4131* (2013.01); *A01G 25/16* (2013.01)

(58) Field of Classification Search
CPC ... H04N 21/4131; A01G 25/16; A01M 29/30; A01M 31/002; Y10T 137/1842
See application file for complete search history.

(56) References Cited

U.S. PATENT DOCUMENTS

| | | | |
|---|---|---|---|
| 5,009,192 A | 4/1991 | Burman | |
| 5,458,093 A | 10/1995 | MacMillan | |
| 5,892,446 A | 4/1999 | Reich | |
| 6,118,375 A | 9/2000 | Duncan | |
| 6,650,239 B1 | 11/2003 | Hron | |
| 6,700,486 B1 | 3/2004 | Banki | |
| 2013/0035774 A1* | 2/2013 | Warren | A01G 25/167 700/90 |
| 2014/0124044 A1 | 5/2014 | Garcia | |
| 2014/0263687 A1* | 9/2014 | Rich | B05B 12/02 239/1 |
| 2016/0267780 A1* | 9/2016 | Talanjeri Krishna | G08C 17/02 |

* cited by examiner

*Primary Examiner* — Omeed Alizada
(74) *Attorney, Agent, or Firm* — Robert C. Montgomery; Montgomery Patent & Design, LP.

(57) ABSTRACT

An intruder alarm and deterrent system includes a plurality of motion sensors around a dwelling being in communication with an existing sprinkler system. Upon sensing an adult intruder, the sprinkler system is activated to broadcast a spray of water to douse, startle, and scare away the intruder. The intruder alarm also provides an audible alarm.

14 Claims, 5 Drawing Sheets

MOTION SENSOR ALARM AND SPRINKLER DEVICE

RELATED APPLICATIONS

The present invention is a continuation of, was first described in, and claims the benefit of U.S. Provisional Application No. 62/055,957, filed Sep. 26, 2014, the entire disclosures of which are incorporated herein by reference.

FIELD OF THE INVENTION

The present invention relates generally to an intruder alarm and deterrent system in communication with an existing sprinkler system.

BACKGROUND OF THE INVENTION

As any home owner will attest, security is an area of primary concern. Due to the fact that people tend to place a high value on their property and personal safety, the market place has responded with a variety of products that are intended to protect a person's dwelling from intruders.

Ranging in design from simple locking devices to complex motion detectors and forced entry alarm systems, these security products comprise a multimillion dollar industry in the United States. Accordingly, there is a constant need for new and innovative devices that aid in securing one's home from burglars, and the like. The use of the deterrent system and sprinkler device provides a means to increase security around a home or building in a manner which is quick, easy, and effective.

SUMMARY OF THE INVENTION

The inventor has recognized the aforementioned lack in the art and observed that there is a need for an intruder alarm and deterrent system in communication with an existing sprinkler system.

It is therefore an object of the invention to provide a motion detection system having a power source; a plurality of motion sensor assemblies each capable of being mounted along a soffit portion of a dwelling; and, a control panel in electrical communication with the power source and configured to be in electrical communication between each motion sensor and a sprinkler system. Each motion sensor assembly has a platform and a motion sensor secured to the platform. In some embodiments the assembly also has an alarm speaker. Each motion sensor is assigned to one (1) of a plurality of sprinkler zones of a sprinkler system. Each motion sensor also generates an alert signal upon sensing an object. The alert signal is transmitted to the control panel which then selectively activates the sprinkler system upon receipt of the alert signal.

The plurality of motion sensor assemblies also may comprise a sensor mount securing the motion sensor to the platform, a mirror secured to the platform and at least one (1) mounting bracket, located on an upper portion of the mirror to removably attach the motion sensor assembly to the soffit portion. The mirror is oriented to be in alignment with a field of view of the motion sensor. The motion sensor is also selectably adjustable with regards to sensing a size of an object. The mirror may be convex.

The control panel may also further comprises a mode control switch, selectable between an off position, a manual position, an auto-sprinkler position and an auto-intruder position, a manual zone control switch, selectable between one (1) of the plurality of sprinkler zones, and a timer control panel, selectable for a desired activation and deactivation of the system based on time. The off position provides for complete deactivation of the system. The manual position provides for manual control of a selected one (1) of the plurality of sprinkler zones, corresponding to a setting of the manual zone control switch. The auto-sprinkler position provides for automatic control of the system corresponding to a setting of the timer control panel. The auto-intruder position provides for automatic control of the sprinkler zones as controlled by the control panel receipt of the alert signal. The power source may be a conventional residential power source or a battery. The control panel may be located remotely from the plurality of motion sensors.

A method of using a motion detection system coupled with a sprinkler system consists of the following steps firstly, obtaining the system described above; secondly, adaptably electrically connecting an existing sprinkler system to the control panel; thirdly, mounting at least one (1) sensor assembly to a suitable support structure; and lastly, selectively programming the control panel to activate the sprinkler system, wherein each motion sensor generates an alert signal upon sensing an object; wherein the alert signal is transmitted to the control panel; wherein if an alarm speaker is present, each is activated by the alert signal thereby emitting an audible alarm; and, wherein the control panel selectively activates the sprinkler system upon receipt of the alert signal.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
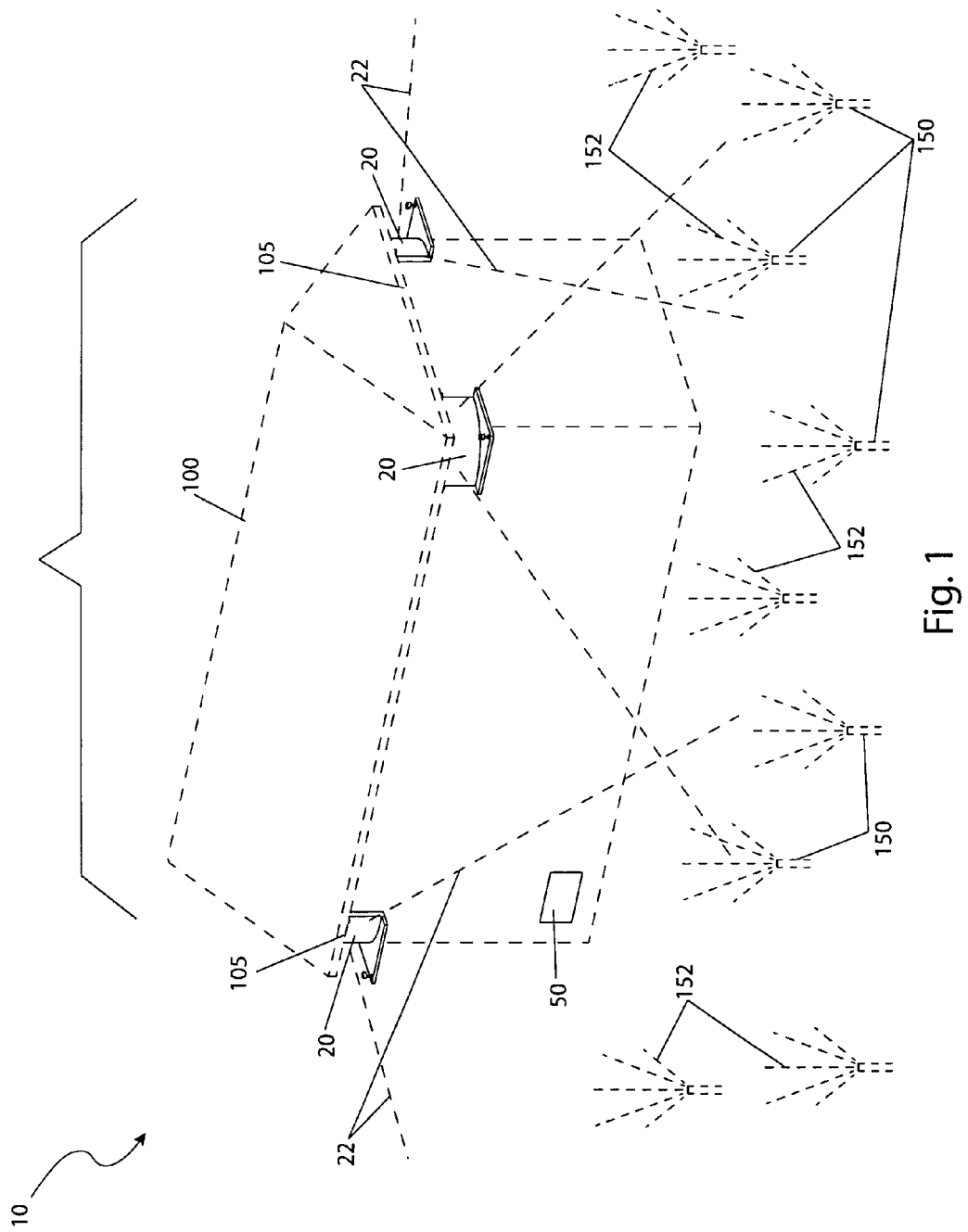
FIG. 1 is an environmental view of a motion detection system 10, according to a preferred embodiment of the present invention.

DESCRIPTIVE KEY 10 motion detection system
20 detector assembly
22 enhanced detection area
24 sensor
25 sensitivity adjustment switch
26 sensor mount
28 sensor field of view
40 platform
42 mirror
44 mounting bracket 46 speaker
50 control panel
100 dwelling
105 soffit
150 sprinkler system
152 spray pattern
200 mode control switch
205 manual zone control switch
210 timer control panel
215 power supply
220 sprinkler solenoid

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIG. 1, an environmental view of a motion detection system (herein described as the "system") 10, which provides an intruder sensing means which activates an existing conventional underground sprinkler system to thwart criminal activity by spraying the intruder being detected using a plurality of security motion sensors 24 discreetly located along soffit portions 105 of a dwelling 100. The sensitivity of the motion sensors 24 is to be adjustable, so as to be able to distinguish between a child and an adult. As an intruder enters an enhanced detection area 22, as defined by sensor portions 24 of respective detector assemblies 20, the sprinkler system 150 is activated. The spray pattern 152 from the sprinkler system 150 is envisioned to startle a possible criminal and scare them away.

The system 10 is envisioned to provide a remotely located control panel 50, perhaps within the dwelling 100, which provides electrical interface with the existing sprinkler system 150. The control panel 50 is envisioned to allow the sprinkler system 150 to function normally as well as provide a means to deactivate the system 10 during activities such as lawn mowing, parties, and the like.

Figure 2A:
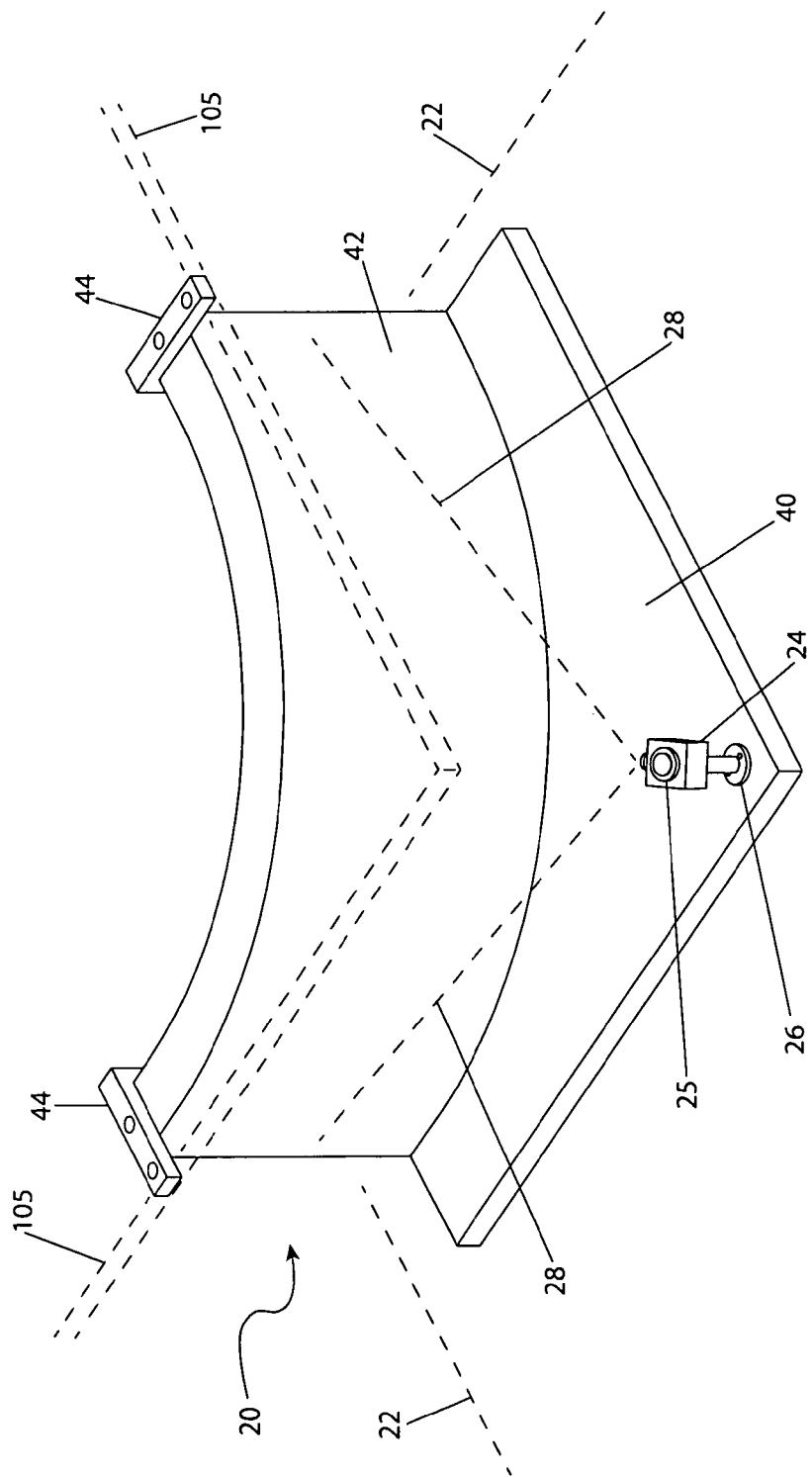
FIG. 2a is a perspective view of a detector assembly portion 20 of the system 10, according to a preferred embodiment of the present invention.

Referring now to FIG. 2a, a perspective view of a detector assembly portion 20 of the system 10, according to a preferred embodiment of the present invention, is disclosed. The system 10 is envisioned to provide a plurality of detector assemblies 20 being located around a dwelling 100 such that a part or all of an adjacent area of the dwelling 100 may be monitored for intruders. The detector assemblies 20 include equipment which results in an enhanced detection area 22 and consequently reduces a number of sensors 24 required to monitor a large target area. The motion detecting sensors 24 are envisioned to include technologies such as, but not limited to: passive infrared, microwave, ultrasonic, video camera software, and dual-technology motion detection.

Each detector assembly 20 includes at least one (1) motion sensor 24 having a sensor mount 26, a platform 40, a mirror 42, and at least one (1) mounting bracket 44 for attachment of the detector assembly 20 to the dwelling 100. An example of the detector assembly 20 is shown here having a soffit-mounted platform 40 and an integral convex mirror 42. The mirror 42 is shown in alignment with the field of view 28 of the motion sensor 24 so as to detect changes in the electromagnetic radiation reflected off the mirror 42 and being received by the sensor 24. The convex mirror 42 is designed to provide a wide-angle enhanced detection area 22; however, it is understood that the illustrated version of the detector assembly 20 should not be interpreted as a limitation of scope, as different sensors 24 being used with or without a mirrors 42 may be utilized as well without deviating from the teachings herein. The sensor 24 further includes a sensitivity adjustment switch 25 being set so as to differentiate between large and small objects within the enhanced detection area 22, therefore only activating the sprinkler system 150 when an adult-sized object is detected.

Figure 2B:
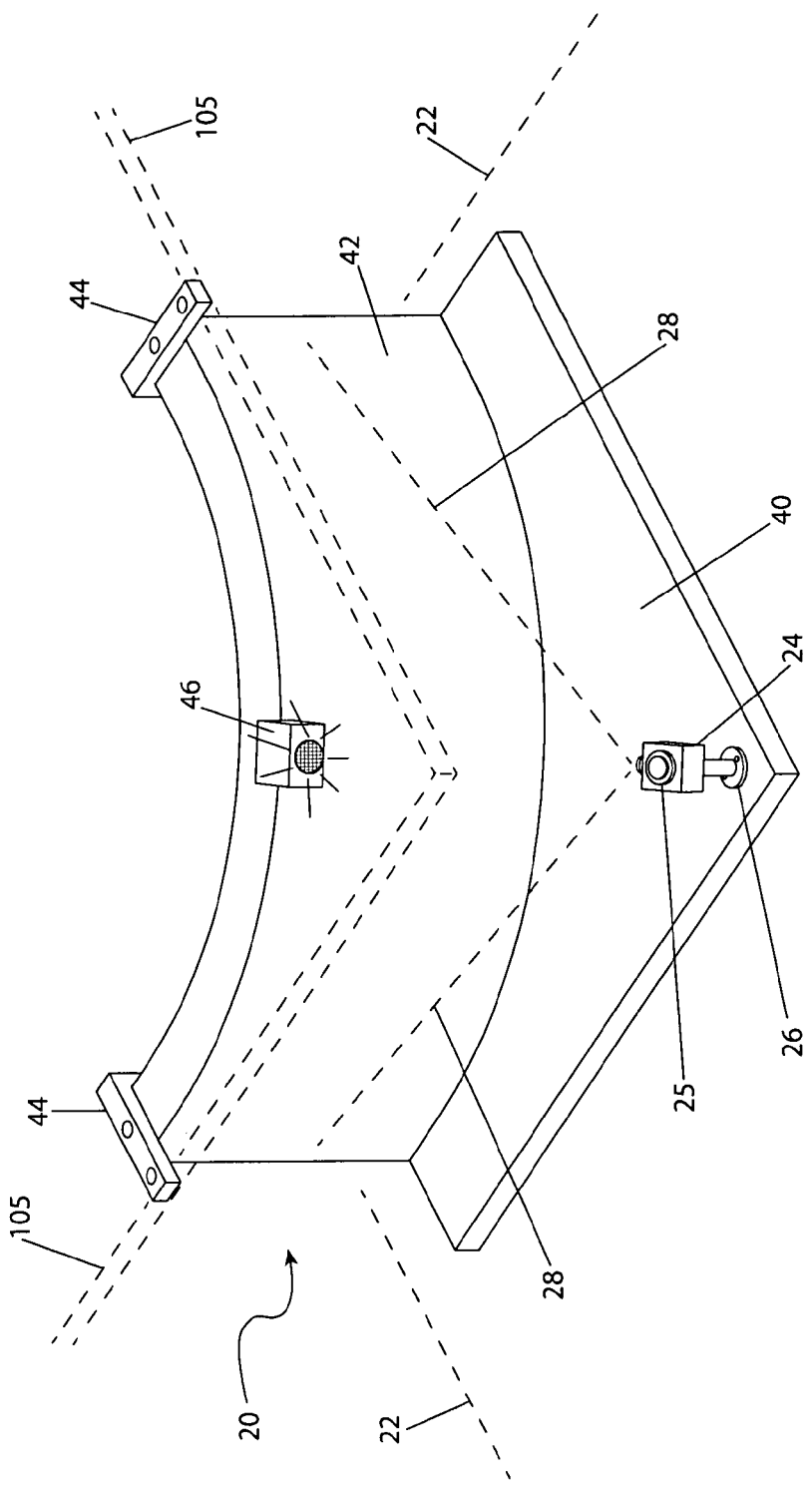
FIG. 2b is a perspective view of the detector assembly portion 20 of the system 10, according to an alternate embodiment of the present invention.

Referring now to FIG. 2b, a perspective view of the detector assembly portion 20 of the system 10, according to an alternate embodiment of the present invention is disclosed. Said alternate embodiment of the follows the teachings of the preferred embodiment and includes at least one (1) motion sensor 24, the sensor mount 26, the platform 40, the mirror 42, and at least one (1) mounting bracket 44 for attachment of the detector assembly 20 to the dwelling 100. In addition, this alternate embodiment also includes an alarm speaker 46. The alarm speaker 46, envisioned to be a piezoelectric type speaker, provides for audible annunciation of a possible intruder. Said annunciation will alert the homeowner or any bystanders for the need for possible defensive action as well as alert the possible offender or trespasser that they are not welcome and should retreat from the enhanced detection area 22 (as shown in FIG. 1) immediately.

Figure 3:
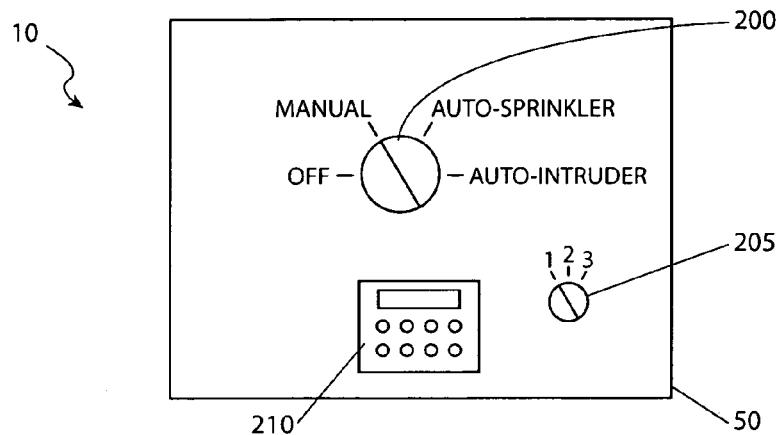
FIG. 3 is a front view of the control panel 50 as used with the system 10, according to preferred embodiment of the present invention.

Referring next to FIG. 3, is a front view of the control panel 50 as used with the system 10, according to preferred embodiment of the present invention is depicted. The control panel provides a mode control switch 200, a manual zone control switch 205, and a timer control panel 210 upon its front face as shown. The mode control switch 200 is provided with four (4) positions; OFF, MANUAL, AUTO-SPRINKLER; and AUTO-INTRUDER. The OFF position provides for complete deactivation of the system 10, such as would be required in the winter months in cold climates. The MANUAL position provides for manual control of specific sprinkler zones as selected through the manual zone control switch 205, such as would be needed for maintenance, trouble shooting, winterization and other specific occurrences. The AUTO-SPRINKLER position provides for automatic control of the system 10 through the timer control panel 210. This position provides for a sprinkler system that operates in a conventional manner and allows for watering of vegetation. Finally, the AUTO-INTRUDER position provides for automatic control of specific sprinkler zones as controlled by the sensor 24 (as shown in FIGS. 2a and 2b), and provides for the specific advantage of the present invention. Further description and specific operation of the system 10 will be provided herein below.

Figure 4:
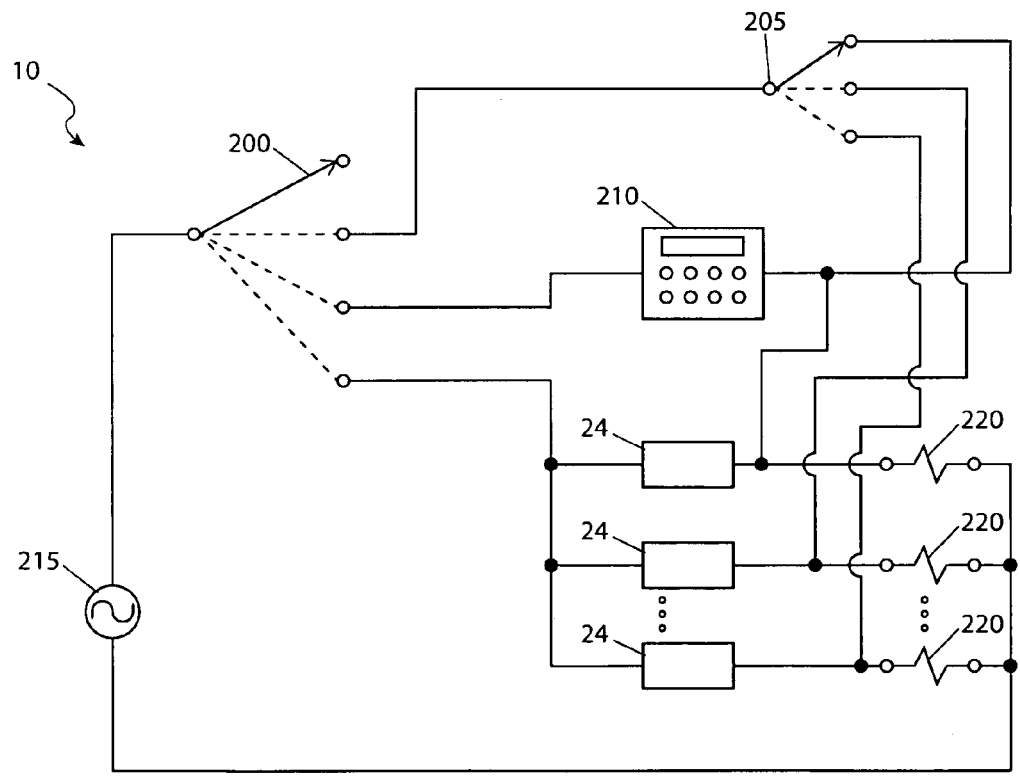
FIG. 4 is an electrical schematic block diagram of the electrical circuit used to control the system 10 according to a preferred embodiment of the present invention; and, FIG. 5 is a process flow diagram of the motion detection system 10, according to a preferred embodiment of the present invention

Referring now to FIG. 4, an electrical schematic block diagram of the electrical circuit used to control the system 10 according to a preferred embodiment of the present invention is shown. Power for the system 10 is provided by a power supply 215 such as an AC power source, DC power source, battery, or the like. Electrical power is then routed through the mode control switch 200, depicted as a single pole, four-position rotary switch. Depending on the mode selected as described in FIG. 3, power is then controlled in one (0) of four (4) different manners. First, power can be deactivated in the OFF position. Second, in the MANUAL position, it is routed through the manual zone control switch 205, here shown as a single pole, three-position switch. Resultant output power is then routed to one (1) of a series of sprinkler solenoids 220 for manual control. Third, in the AUTO-SPRINKLER position, power is routed through the timer control panel 210 where automatic control is provided. The timer control panel 210 is well known in the art and is intended to control the sprinkler solenoids 220 based upon time of day, day of week, current weather conditions, forecast weather conditions or the like. Fourth and finally, in the AUTO-INTRUDER position, the mode control switch 200, routes power to a series of respective sensors 24 so that a respective sprinkler solenoid 220 can be automatically controlled as required. In the case of the alternate embodiment of FIG. 2b, the speakers 46 (as shown in FIG. 2b) would be wired in parallel with the output of the sensors 24 along with a blocking diode to prevent activation of the speakers 46 (as shown in FIG. 2b) during operation of the system 10 when in the MANUAL mode or AUTO-SPRINKLER mode.

Figure 5:
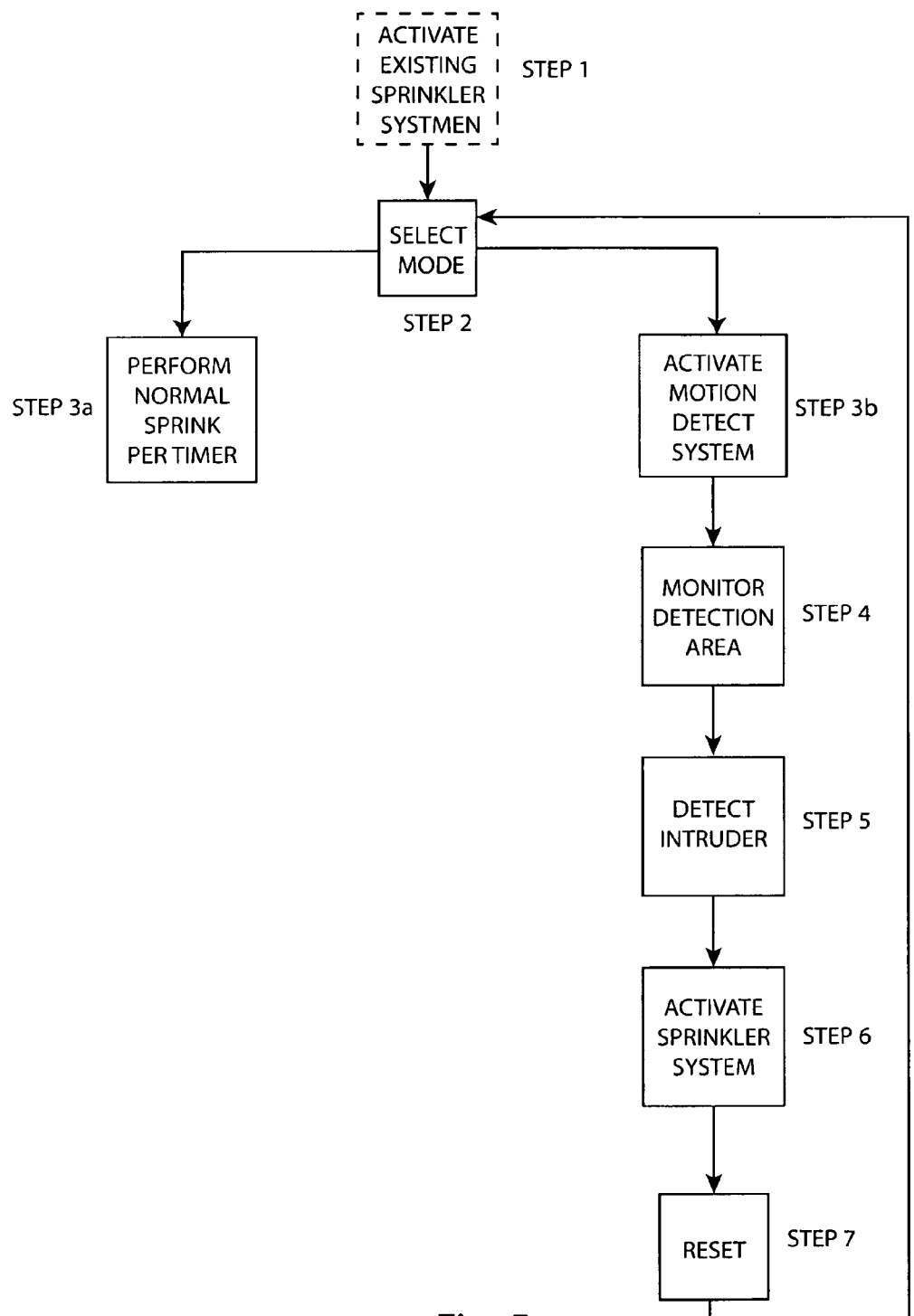

Referring finally to FIG. 5, a process flow diagram of the system 10, according to a preferred embodiment of the present invention, is disclosed. An example sequence of operational steps is provided as follows:

Step 1—Activate the existing sprinkler system
Step 2—Select a sprinkler system mode
Step 3a—Either select the existing timed sprinkler mode, or
Step 3b—Select the motion detection mode
Step 4—Monitor the detection area
Step 5—Detect an intruder (adult)
Step 6—Activate the sprinkler system
Step 7—Reset the system 10 and return to Step 2

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of installing and utilizing the system 10 may be achieved by performing the following steps: procuring a model of the system 10 having a desired number of detection assemblies 20; mounting the detection assemblies 20 to the dwelling 100, such as a soffit portion 105, to monitor a respective enhanced detection area 22; wiring a control panel 50 and other portions of the system 10 so as to be in electrical communication with an existing sprinkler system 150; allowing the existing sprinkler system 150 to function in a normal manner, when desired; adjusting the sensitivity adjustment switch 25 so as to able the system 10 to distinguish between a child and an adult; selection of the proper operation mode via the mode control switch 200; arming the system 10 so as to monitor the enhanced detection area 22 for an adult intruder; allowing the system 10 activate the sprinkler system 150 upon detecting an intruder present within the enhanced detection area 22; allowing the sprinkler system 150 to broadcast a spray pattern of water 152 to douse, startle, and scare away the possible criminal; deactivating the system 10 using the control panel 50, when desired, during activities such as lawn mowing, parties, and the like; and, benefiting from a system 10 which detects an intruder, and utilizes an existing sprinkler system 150 to deter the intruder, afforded a user of the present invention 10.

What is claimed is:

1. A motion detection system, comprising:
   a power source;
   a plurality of motion sensor assemblies, each capable of being mounted along a soffit portion of a dwelling and each comprising:
      a platform;
      a motion sensor secured to said platform;
      a sensor mount securing said motion sensor to said platform;
      a mirror secured to said platform; and,
      at least one mounting bracket, located on an upper portion of said mirror to removably attach said motion sensor assembly to said soffit portion;
      wherein said mirror is oriented to be in alignment with a field of view of said motion sensor;
   a control panel in electrical communication with said power source and configured to be in electrical communication between each motion sensor and a sprinkler system comprising:
      a mode control switch, selectable between an off position, a manual position, an auto-sprinkler position and an auto-intruder position;
      a manual zone control switch, selectable between one of said plurality of sprinkler zones; and,
      a timer control panel, selectable for a desired activation and deactivation of said system based on time;
      wherein said off position provides for complete deactivation of said system;
      wherein said manual position provides for manual control of a selected one of said plurality of sprinkler zones, corresponding to a setting of said manual zone control switch;
      wherein said auto-sprinkler position provides for automatic control of said system corresponding to a setting of said timer control panel; and,
      wherein said auto-intruder position provides for automatic control of said sprinkler zones as controlled by said control panel receipt of said alert signal;
   wherein each motion sensor is assigned to one of a plurality of sprinkler zones of said sprinkler system;
   wherein each motion sensor generates an alert signal upon sensing an object;
   wherein said alert signal is transmitted to said control panel; and,
   wherein said control panel selectively activates said sprinkler system upon receipt of said alert signal.

2. The system of claim 1, wherein said motion sensor is selectably adjustable with regards to sensing a size of an object.

3. The system of claim 1, wherein said mirror is convex.

4. The system of claim 1, wherein said power source is a conventional residential power source.

5. The system of claim 1, wherein said power source is a battery.

6. The system of claim 1, wherein said control panel is located remotely from said plurality of motion sensors.

7. A motion detection system, comprising:
   a power source;
   a plurality of motion sensor assemblies each capable of being mounted along a soffit portion of a dwelling and each comprising:

a platform;
a motion sensor secured to said platform;
an alarm speaker;
a sensor mount securing said motion sensor to said platform;
a mirror secured to said platform; and,
at least one mounting bracket, located on an upper portion of said mirror to removably attach said motion sensor assembly to said soffit portion;
wherein said mirror is oriented to be in alignment with a field of view of said motion sensor;
a control panel in electrical communication with said power source and configured to be in electrical communication between each motion sensor and a sprinkler system comprising:
a mode control switch, selectable between an off position, a manual position, an auto-sprinkler position and an auto-intruder position;
a manual zone control switch, selectable between one of said plurality of sprinkler zones; and,
a timer control panel, selectable for a desired activation and deactivation of said system based on time;
wherein said off position provides for complete deactivation of said system;
wherein said manual position provides for manual control of a selected one of said plurality of sprinkler zones, corresponding to a setting of said manual zone control switch;
wherein said auto-sprinkler position provides for automatic control of said system corresponding to a setting of said timer control panel; and,
wherein said auto-intruder position provides for automatic control of said sprinkler zones as controlled by said control panel receipt of said alert signal;
wherein each motion sensor is assigned to one of a plurality of sprinkler zones of said sprinkler system;
wherein each motion sensor generates an alert signal upon sensing an object;
wherein said alert signal is transmitted to said control panel;
wherein each alarm speaker is activated by said alert signal thereby emitting an audible alarm; and,
wherein said control panel selectively activates said sprinkler system upon receipt of said alert signal.

8. The system of claim 7, wherein said motion sensor is selectably adjustable with regards to sensing a size of an object.

9. The system of claim 7, wherein said mirror is convex.

10. The system of claim 7, wherein said power source is a conventional residential power source.

11. The system of claim 7, wherein said power source is a battery.

12. The system of claim 7, wherein said control panel is located remotely from said plurality of motion sensors.

13. A method of using a motion detection system coupled with a sprinkler system, comprising the following steps:
providing said system comprising:
a power source;
at least one motion sensor assembly, each comprising:
a platform;
a motion sensor secured to said platform, each assigned to one of a plurality of sprinkler zones of said sprinkler system;
a sensor mount securing said motion sensor to said platform;
a mirror secured to said platform and oriented to be in alignment with a field of view of said motion sensor; and,
at least one mounting bracket, located on an upper portion of said mirror;
wherein said mirror is oriented to be in alignment with a field of view of said motion sensor;
a control panel in electrical communication with said power source and in electrical communication with each motion sensor, further comprising:
a mode control switch, selectable between an off position, a manual position, an auto-sprinkler position and an auto-intruder position;
a manual zone control switch, selectable between one of said plurality of sprinkler zones; and,
a timer control panel, selectable for a desired activation and deactivation of said system based on time;
wherein said off position provides for complete deactivation of said system;
wherein said manual position provides for manual control of a selected one of said plurality of sprinkler zones, corresponding to a setting of said manual zone control switch;
wherein said auto-sprinkler position provides for automatic control of said system corresponding to a setting of said timer control panel; and,
wherein said auto-intruder position provides for automatic control of said sprinkler zones as controlled by said control panel receipt of said alert signal;
adaptably electrically connecting said sprinkler system to said control panel;
mounting said at least one sensor assembly to a suitable support structure; and,
selectively programming said control panel to activate said sprinkler system, wherein each motion sensor generates an alert signal upon sensing an object; said alert signal is transmitted to said control panel and said control panel selectively activates said sprinkler system upon receipt of said alert signal.

14. A method of using a motion detection system coupled with a sprinkler-system, comprising the following steps:
providing said system comprising:
a power source;
at least one motion sensor, assembly, each comprising:
a platform;
a motion sensor secured to said platform, each assigned to one of a plurality of sprinkler zones of said sprinkler system;
an alarm speaker;
a sensor mount securing said motion sensor to said platform;
a mirror secured to said platform and oriented to be in alignment with a field of view of said motion sensor; and,
at least one mounting bracket, located on an upper portion of said mirror;
wherein said mirror is oriented to be in alignment with a field of view of said motion sensor;
a control panel in electrical communication with said power source and in electrical communication with each motion sensor, further comprising:
a mode control switch, selectable between an off position, a manual position, an auto-sprinkler position and an auto-intruder position;
a manual zone control switch, selectable between one of said plurality of sprinkler zones; and, a timer control panel, selectable for a desired activation and deactivation of said system based on time;

wherein said off position provides for complete deactivation of said system;

wherein said manual position provides for manual control of a selected one of said plurality of sprinkler zones, corresponding to a setting of said manual zone control switch;

wherein said auto-sprinkler position provides for automatic control of said system corresponding to a setting of said timer control panel; and, wherein said auto-intruder position provides for automatic control of said sprinkler zones as controlled by said control panel receipt of said alert signal;

adaptably electrically connecting an existing sprinkler system to said control panel;

mounting said at least one sensor assembly to a suitable support structure; and, selectively programming said control panel to activate said sprinkler system, wherein each motion sensor generates an alert signal upon sensing an object, said alert signal is transmitted to said control panel, each alarm speaker is activated by said alert signal thereby emitting an audible alarm and said control panel selectively activates said sprinkler system upon receipt of said alert signal.

\* \* \* \* \*